(12) United States Patent
Shikiya

(10) Patent No.: US 6,821,006 B2
(45) Date of Patent: Nov. 23, 2004

(54) HEADLIGHT ASSEMBLY FOR A WORKING VEHICLE

(75) Inventor: Hajime Shikiya, Kishiwada (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/173,959

(22) Filed: Jun. 18, 2002

(65) Prior Publication Data

US 2003/0012033 A1 Jan. 16, 2003

(30) Foreign Application Priority Data

Jun. 22, 2001 (JP) ........................................ 2001-189710

(51) Int. Cl.[7] .............................................. B60Q 1/00
(52) U.S. Cl. ........................ 362/496; 362/517; 362/543; 362/546
(58) Field of Search ................................. 362/496, 517, 362/546, 502, 240, 497, 543, 547, 520, 522, 309, 328, 544, 294, 373; 49/463, 464, 415; 180/69.2, 69.21, 69.24

(56) References Cited

U.S. PATENT DOCUMENTS 4,831,503 A * 5/1989 DeSantis et al. ............ 362/497
5,718,303 A    2/1998 Ogasawara et al.
2002/0044455 A1 * 4/2002 Ozawa et al. ................ 362/547
2002/0097585 A1 * 7/2002 Mochizuki et al. .......... 362/517

FOREIGN PATENT DOCUMENTS

| JP | 8-58468 | 3/1996 |
|---|---|---|
| JP | 8-99539 | 4/1996 |
| JP | 8-198139 | 8/1996 |

* cited by examiner

Primary Examiner—Alan Cariaso
Assistant Examiner—Mark Tsidulko
(74) Attorney, Agent, or Firm—Webb Ziesenheim Logsdon Orkin & Hanson, P.C.

(57) ABSTRACT

A headlight assembly for a working vehicle includes a body (16) having a front frame (19), and side frames (20) bent and extending rearward from opposite ends of the front frame, and light source units mounted in a pair of right and left openings (21) formed in the body. The body (16) is an integral unit formed of resin. The light source units include a pair of right and left main bulbs for forward illumination, and reflector units for forwardly reflecting light from the main bulbs. A cover member (18) is provided for covering at least a large part of the body. The cover member (18) includes a pair of right and left lens regions opposed to light radiating planes of the reflector units (32), respectively, a front wall region (33) interconnecting the these lens regions, and side wall regions (34) bent and extending rearward from lateral ends of the lens regions, respectively.

33 Claims, 11 Drawing Sheets

HEADLIGHT ASSEMBLY FOR A WORKING VEHICLE

BACKGROUND OF THE INVENTION

1. Field of the Invention

This invention relates to a headlight assembly for a working vehicle, with light source units mounted in a pair of right and left openings formed in a body having a front frame and side frames bent and extending rearward from opposite ends of the front frame, the light source units including a pair of right and left main bulbs for emitting light forward, and reflectors for forwardly reflecting light from the main bulbs.

2. Description of the Related Art

Conventionally, as seen from U.S. Pat. No. 5,718,303, for example, a headlight assembly for a working vehicle includes a body attached to a vehicle frame, the body being in the form of a plastic molding with a high degree of freedom for molding. The headlight assembly further includes reflectors mounted in a pair of right and left openings formed in the body, and cover members fitted for covering the light radiation planes (front planes with respect to a moving direction of the working vehicle) and acting as a pair of right and left optical lenses. These cover members usually are formed of an acrylic resin that is hard and highly transparent.

However, according to the prior art noted above, the entire headlight assembly relies solely on the body for strength. To secure a high degree of strength for the entire headlight assembly, therefore, the body must be molded into a complex shape to have high strength, or must be reinforced such as by adding reinforcing members to the body. This leads to a complicated body configuration or addition of new reinforcing members. As a result, the headlight assembly has drawbacks of increased manufacturing cost and complicated construction.

SUMMARY OF THE INVENTION

The object of this invention is to provide a headlight assembly having high strength as a unit without entailing high manufacturing cost and complicated construction.

The above object is fulfilled, according to this invention, by a headlight assembly for a working vehicle having a body and optical units as set out at the outset hereof, in which a cover member is provided for covering at least a large part of the body, the cover member including a pair of right and left lens regions opposed to light radiating planes of the reflector units which forwardly reflect light from main bulbs acting as light source units, respectively, a front wall region interconnecting the these lens regions, and side wall regions bent and extending rearward from lateral ends of the lens regions, respectively.

In this construction, the cover member approximately C-shaped in plan view is joined to the body also approximately C-shaped in plan view, to cover, from front with respect to a moving direction of the working vehicle, the light radiating planes of the reflector units which forwardly reflect light from the main bulbs. As a result, the entire body is reinforced by the cover member, to secure high strength for the entire headlight assembly.

The cover member in the form of a single unit for covering the right and left light radiating planes from front requires a simplified assembly procedure, compared with a pair of right and left cover members provided for individually covering the right and left light radiating planes.

In a preferred embodiment of the invention, the cover member has horizontally extending ribs formed on bent portions of the sidewall regions. With this construction, the ribs increase the strength of the sidewall regions of the cover member. The increased strength of the sidewall regions contributes to stability of the cover member joined to the body.

In a preferred embodiment of the invention, the cover member similarly has horizontally extending ribs formed on the front wall region. These ribs reinforce the front wall region of the cover member, and particularly minimize possible bending of the front wall region of the cover member.

In a preferred embodiment of the invention, the front wall region of the cover member has a vertical width: L1 smaller than a vertical width: L2 of the lens regions to produce a feature in outward appearance. In this case, the front frame includes an upper beam and a lower beam extending horizontally, and each of the upper and lower beams includes portions corresponding to the lens regions of the cover member and having a smaller vertical width than a portion corresponding to the front wall region, to maintain balance in strength.

In a preferred embodiment of the invention, the reflector units having reflecting surfaces each formed polygonal to have a plurality of reflecting elements for producing a predetermined light collecting and distributing pattern, and the lens regions of the cover member each formed of a substantially single surface. In this construction, the reflecting surface of each reflector unit is formed polygonal, thereby dispensing with a need to form the lens areas of the cover member to have a complex shape, e.g. numerous convex lens surfaces.

The reflector units include a pair of right and left reflectors surrounding the main bulbs acting as headlights. The right reflector and left reflector may be formed separately or may be integrated.

An operation is required to deposit aluminum, for example, on inner surfaces of the reflectors to form reflecting surfaces. According to this invention, the right and left reflectors are manufactured independently of the body. In time of a reflecting surface forming operation, there is no need to perform a troublesome preliminary operation to mask the body, for example.

In a further preferred embodiment of the invention, the light source units further include right and left sub-reflectors for laterally reflecting light from sub-bulbs, the sidewall regions of the body being formed to transmit light reflected by the sub-reflectors. With this construction, when making a turn at nighttime, the vehicle can illuminate the turning direction beforehand for the driver to visually check, with ease, road conditions and presence or absence of obstacles in the turning direction. Further, since the working vehicle can illuminate sideways, the driver may visually determine conditions of a location for storage with ease when storing the vehicle into an unlit barn, for example. Moreover, the right and left side frames of the body approximately C-shaped in plan view are effectively used for the sub-reflectors for lateral illumination, and the right and left side wall regions of the cover member C-shaped in plan view are effectively used for sub-lenses for lateral illumination. This reduces the number of parts compared with the case of using separate members to form the sub-reflectors and sub-lenses.

Other features and advantages of this invention will be apparent from the following description of the embodiment to be taken with reference to the drawings.

DESCRIPTION OF THE PREFERRED EMBODIMENTS

Figure 1:
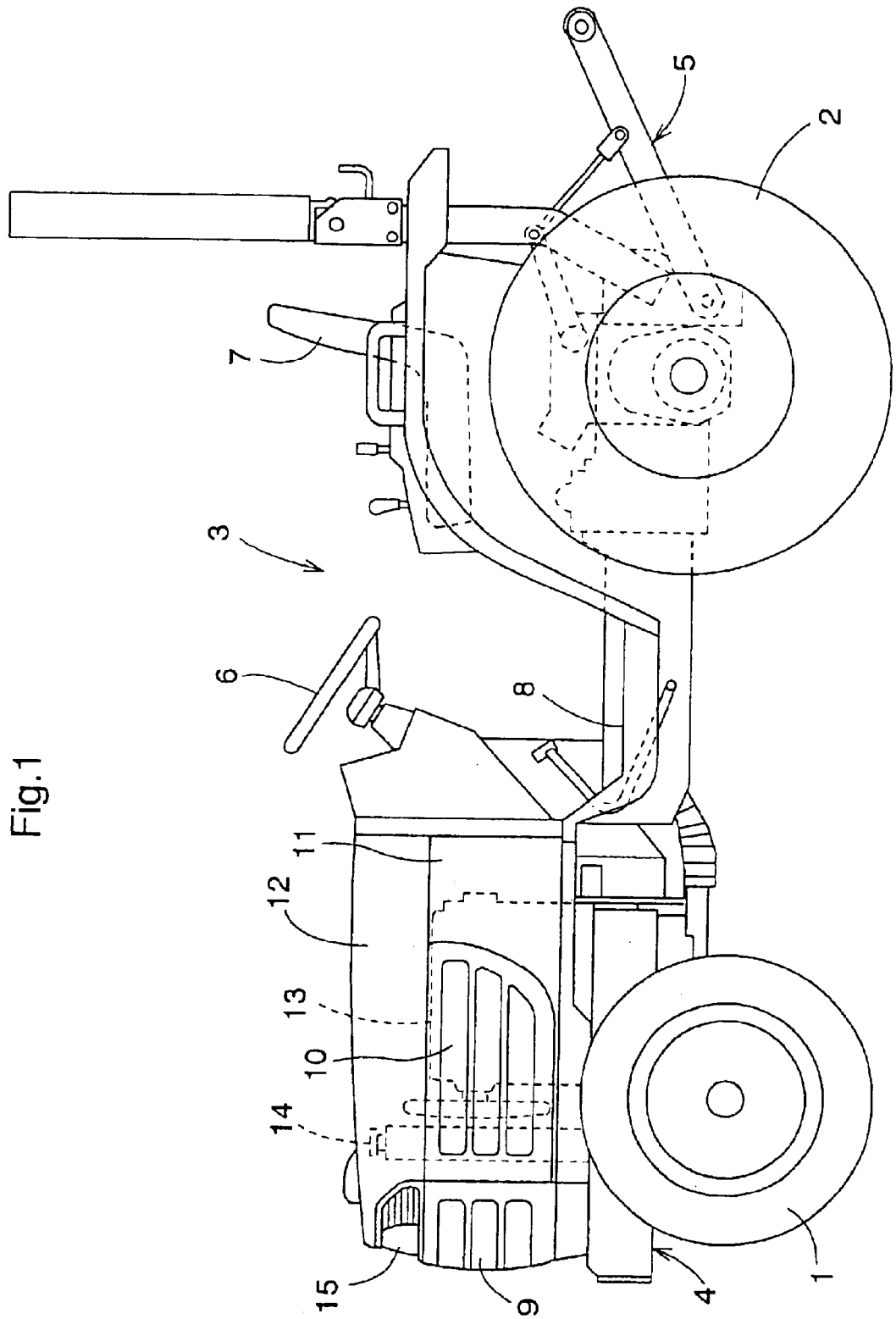
FIG. 1 is a side elevation of a tractor.
Figure 2:
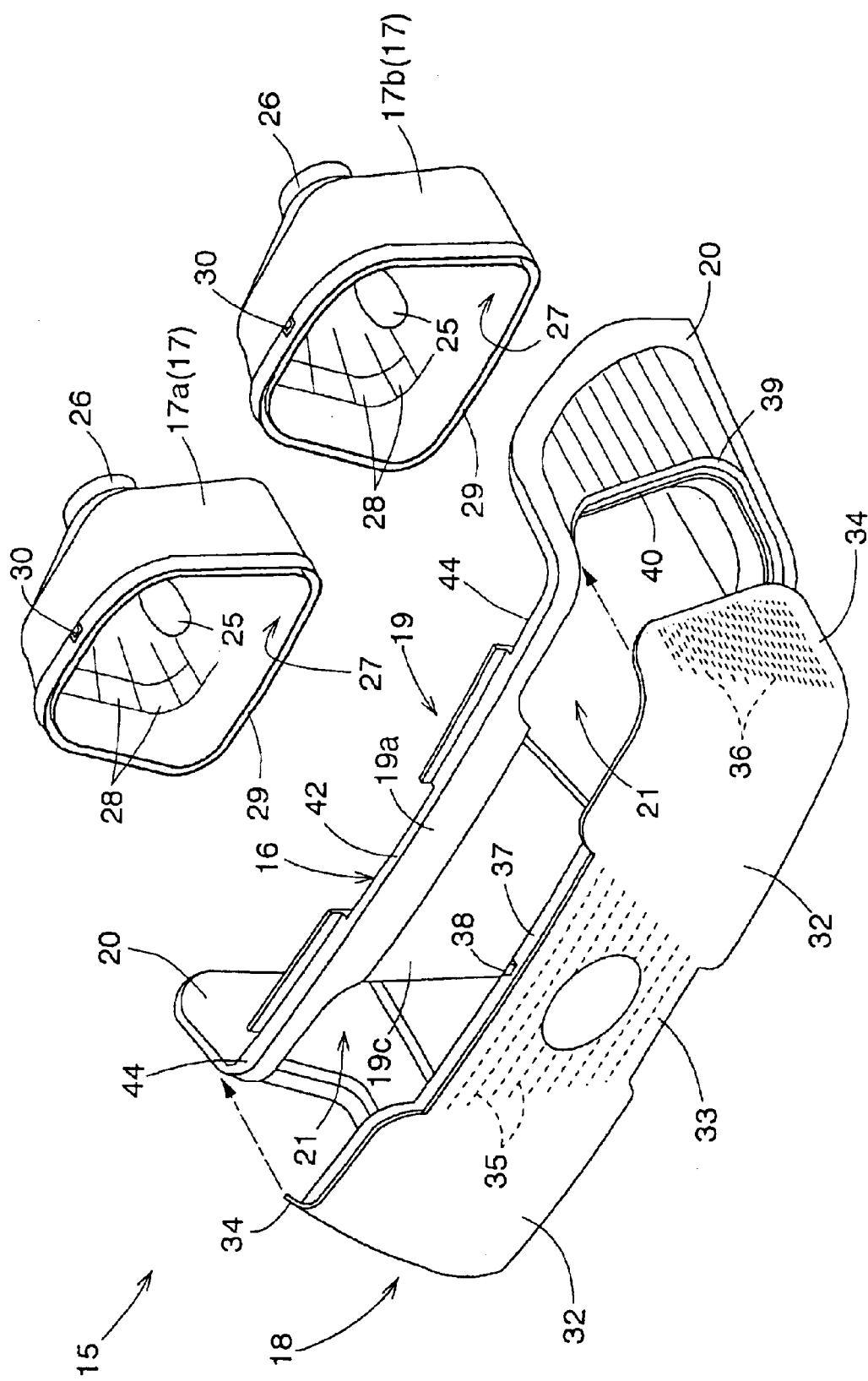
FIG. 2 is an exploded perspective view of a headlight assembly.
Figure 3:
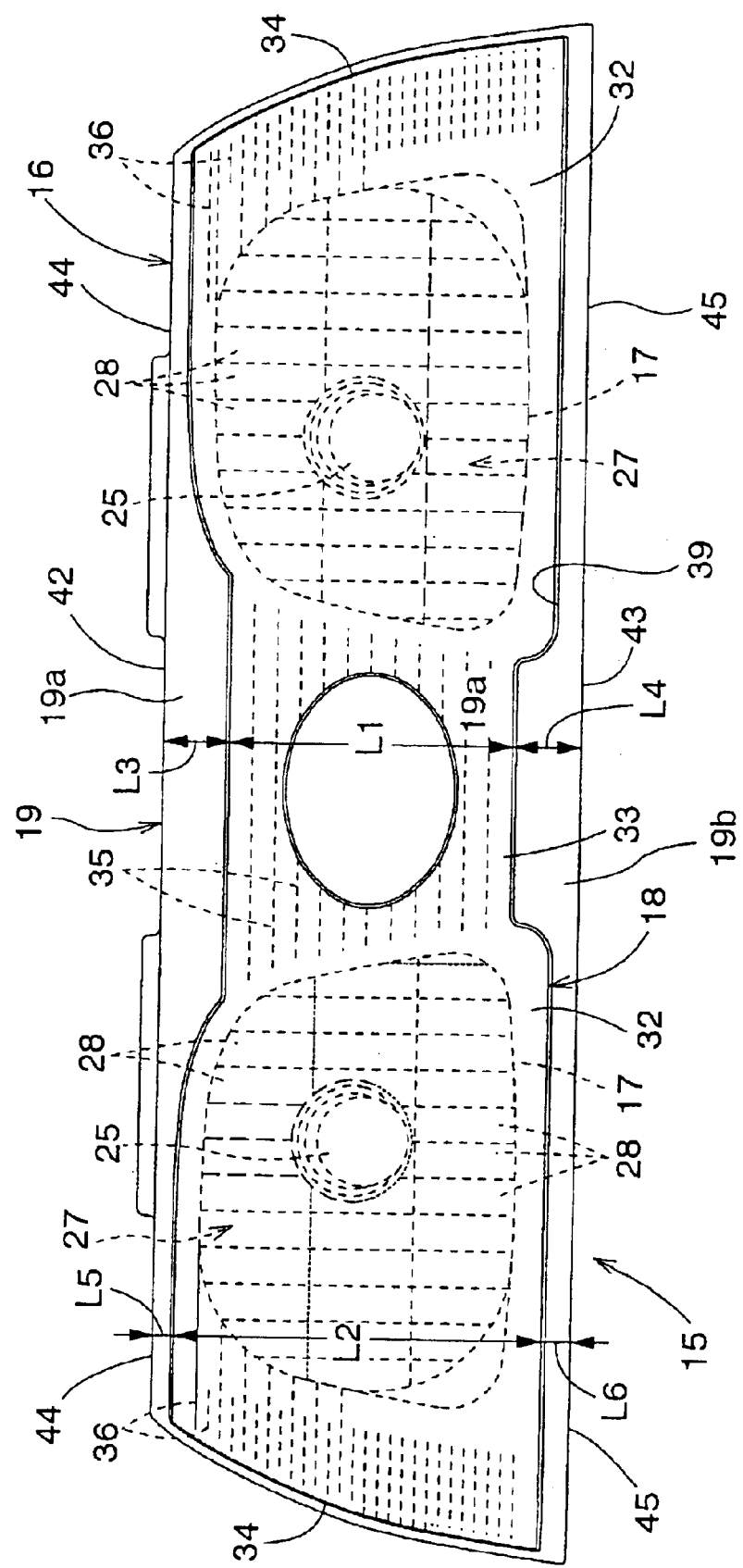
FIG. 3 is a front view of the headlight assembly.
Figure 4:
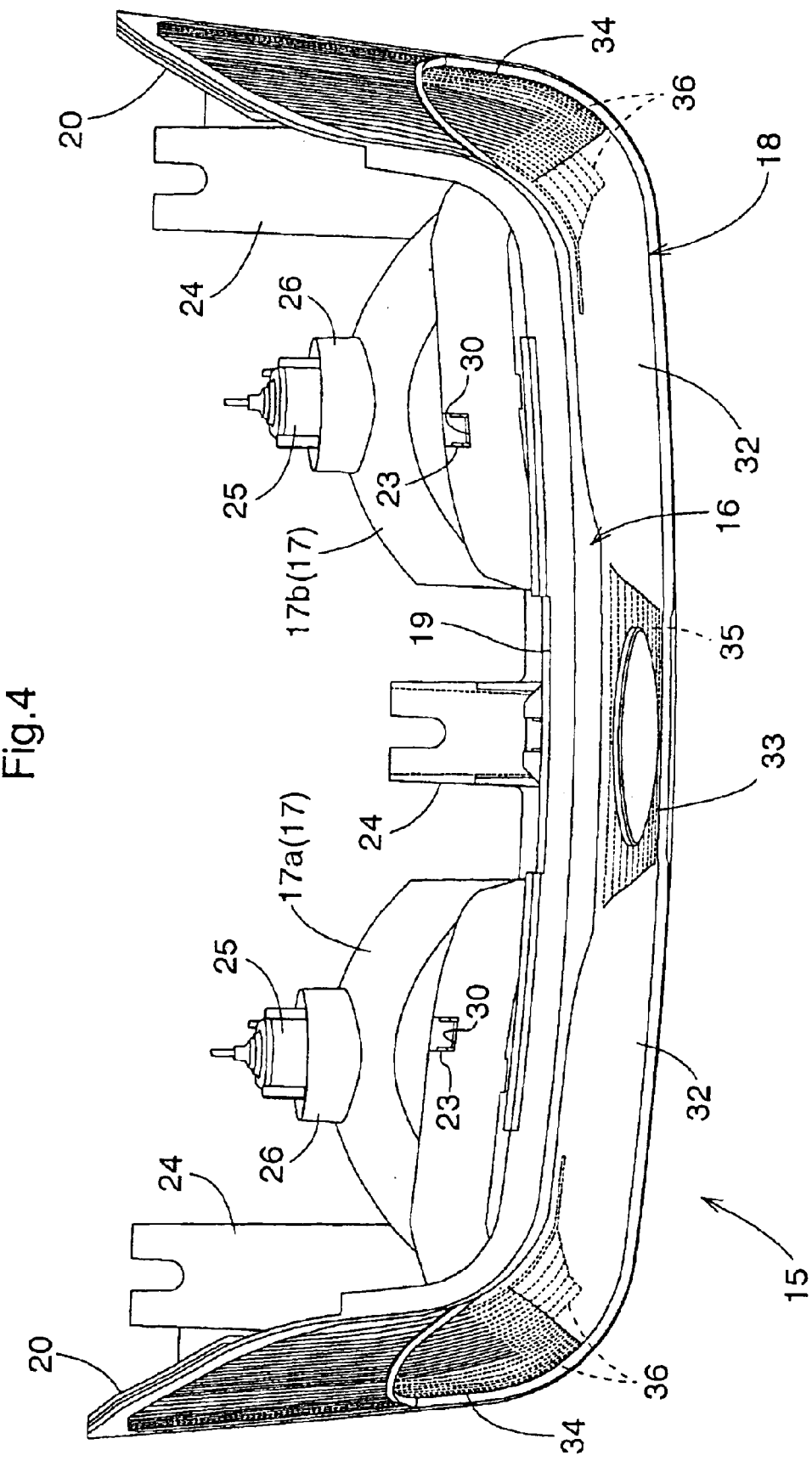
FIG. 4 is a plan view of the headlight assembly.
Figure 5:
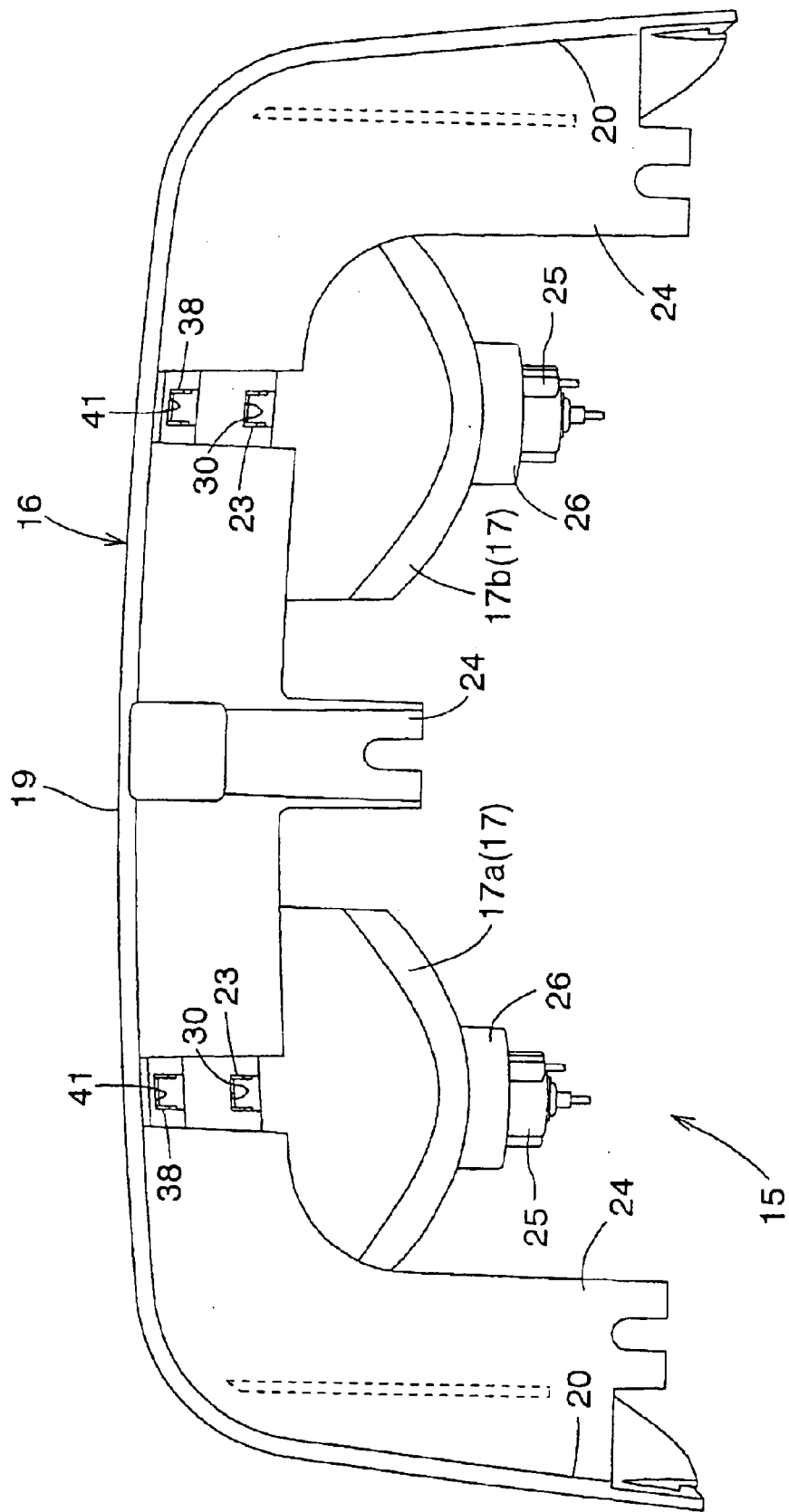
FIG. 5 is a bottom plan view of the headlight assembly.
Figure 6:
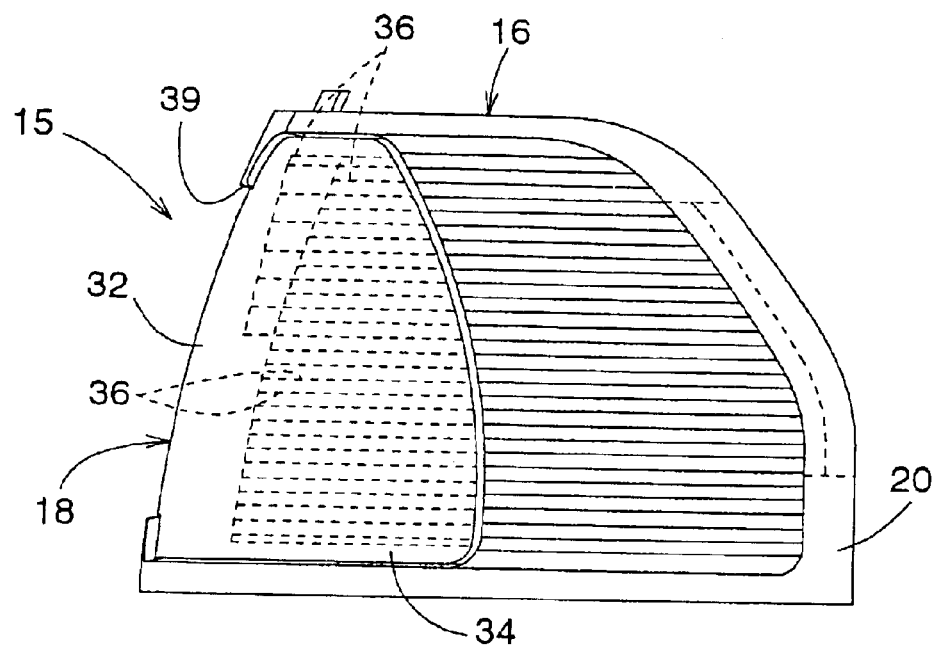
FIG. 6 is a side view of the headlight assembly.
Figure 7:
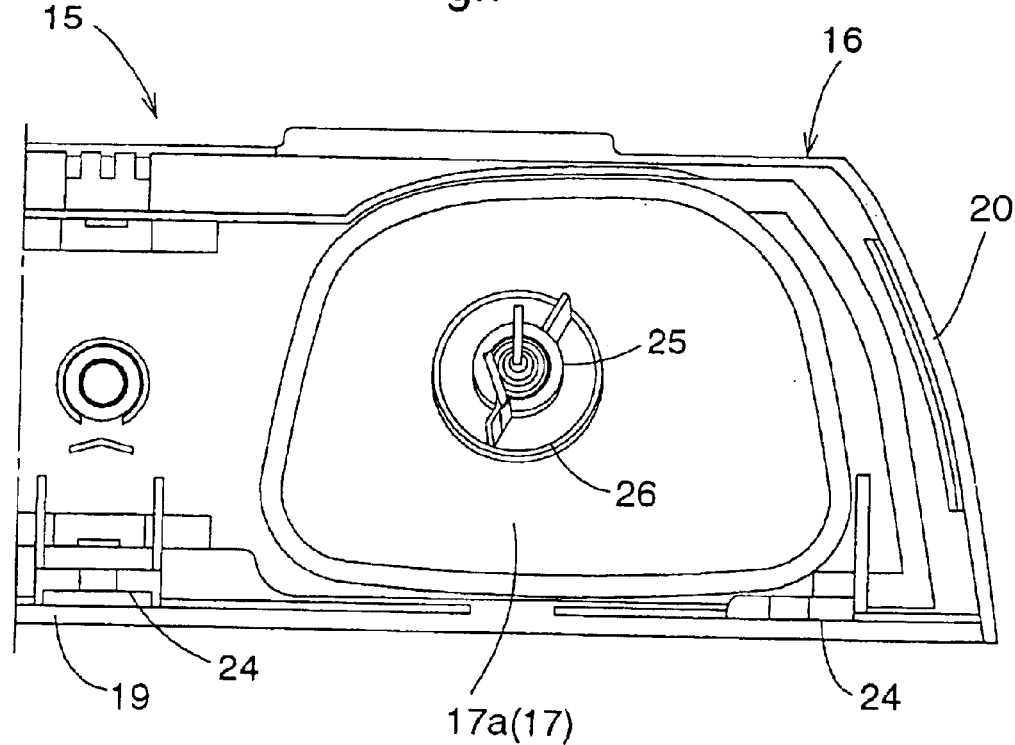
FIG. 7 is a rear view of a principal portion of the headlight assembly.

FIG. 1 shows a side elevation of a tractor which is one example of working vehicles. This tractor includes a pair of right and left front wheels 1, a pair of right and left rear wheels 2, and a driving platform 3 formed on a vehicle frame 4 between the front and rear wheels. The vehicle frame 4 has a link mechanism 5 attached to a rear end thereof to be vertically movable for coupling a working implement to the tractor.

The driving platform 3 includes a steering wheel 6 interlocked to the right and left front wheels 1, a driver's seat 7 disposed between the right and left rear wheels 2, and a footrest 8 disposed between the front wheels 1 and rear wheels 2.

In a front position of the vehicle frame 4, an engine room is formed by a front grille 9 for drawing in air, a pair of right and left side panels 11 defining side grilles 10 for exhausting air, and an openable hood 12. An engine 13 and a radiator 14 are mounted in the engine room.

As shown in FIGS. 1 through 11, a headlight assembly 15 is mounted in an upper portion of the front grille 9. The headlight assembly 15 includes a single body 16 formed by molding ASA (acrylonitrile styrene acrylate) resin, right and left reflectors 17 formed by molding PP (polypropylene) resin and a single cover member 18 formed by molding an acrylic resin.

The body 16 is as a whole approximately C-shaped in plan view, and includes a front frame 19 facing forward with respect to a (forward) moving direction of the tractor, and a pair of right and left side frames 20 extending rearward from opposite end regions of the front frame 19. The front frame 19 includes a plate-like upper beam 19a and lower beam 19b, and a central portion 19c interconnecting these beams 19a and 19b. Openings 21 are formed at opposite sides of the central portion 19c for receiving a light source unit.

The light source unit includes main bulbs 25 and reflector units 17. In this embodiment, the reflector units 17 include a left reflector 17a and a right reflector 17b made independently of each other. One main bulb 25 is mounted in each of these reflectors 17a and 17b. Each of the reflectors 17a and 17b is cup-shaped and defines an inner reflecting surface, with the main bulb 25 attached. An opening area thereof defines a light radiating plane for forwardly radiating light from the main bulb 25 and light reflected inside each reflector.

As a modified embodiment, these reflectors 17a and 17b may be interconnected by a connecting member. In this case, the reflector unit 17 is manufactured as a single component having the left reflector 17a and right reflector 17b.

Figure 9:
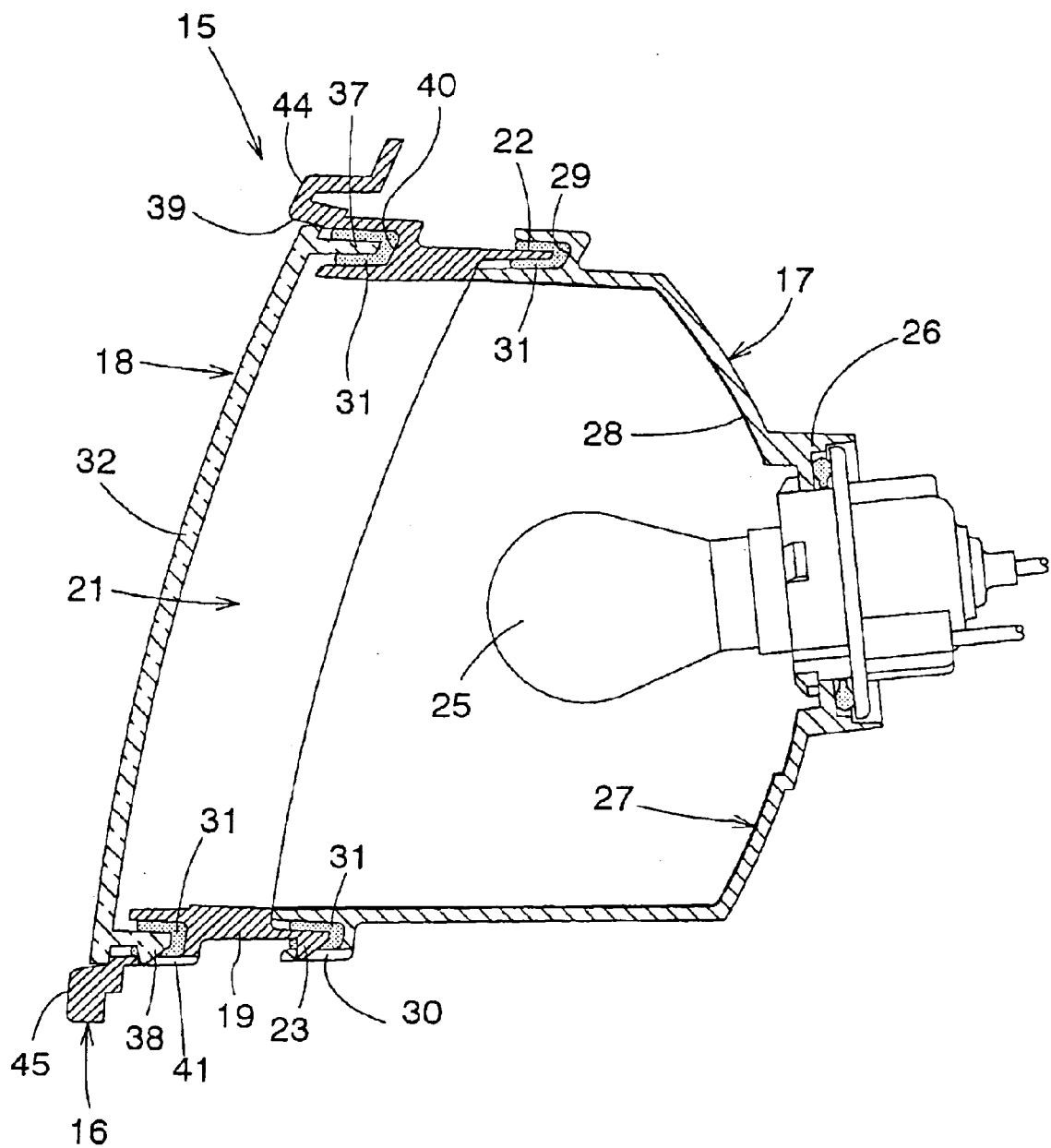
FIG. 9 is a side view in vertical section of a reflector of the headlight assembly.
Figure 10:
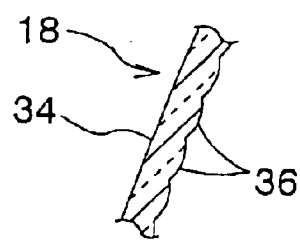
FIG. 10 is a side view in vertical section of a sidewall region of a cover.
Figure 11:
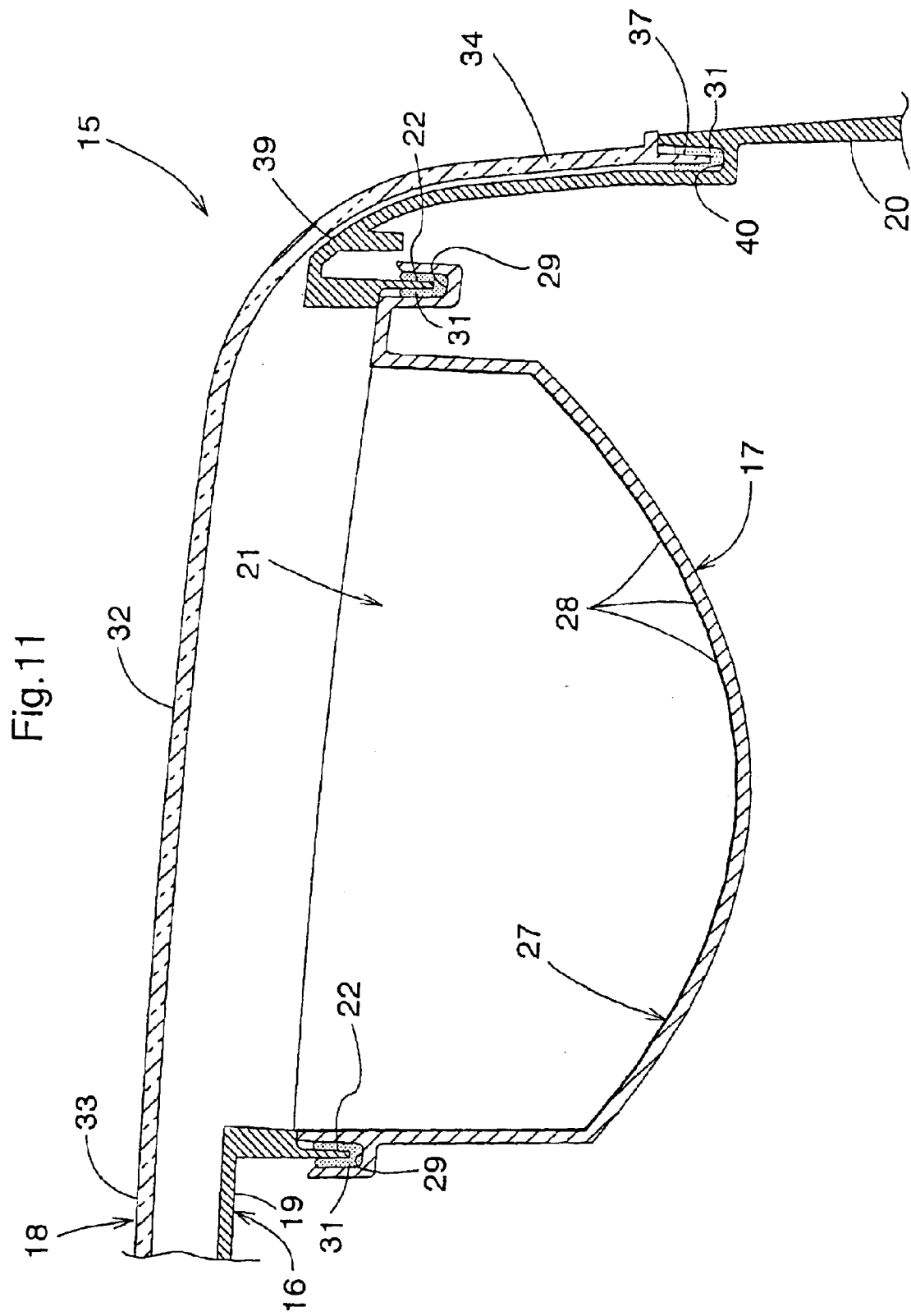
FIG. 11 is a cross-sectional view of a principal portion of the headlight assembly.

Surrounding edges of each opening 21 define an engaging edge 22 for engaging the reflector 17a or 17b, and a hook 23 for hooking the reflector 17a or 17b (see FIG. 9). The body 16 has flanges 24 extending inwardly from lower edges of the front frame 19 and right and left side frames 20 for connection to the front grille 9. These flanges 24 (see FIG. 5) are connected to the front grille 9 by bolts.

Each of the right and left reflectors 17a and 17b is approximately cup-shaped as noted hereinbefore, and defines a bulb mount 26 for detachably attaching the main bulb 25 for forward illumination. Each reflector 17a or 17b has an inner surface given aluminum deposition treatment to act as a reflecting surface 27 for forwardly reflecting light from the main bulb 25. The reflecting surface 27 is formed polygonal to have a plurality of reflecting elements 28 for obtaining a predetermined light collecting and distributing pattern. Front edges of each reflector 17a or 17b define an engaging groove 29 for engaging the engaging edge 22 of the body 16 (see FIG. 9), and a hooked portion 30 hooked by the hook 23 of the body 16 (see FIG. 4).

Each reflector 17a or 17b may be attached to the body 16 by placing the engaging edge 22 of the body 16 in the engaging groove 29 of the reflector 17a or 17b, with an adhesive 31 filling the engaging groove 29, and placing the hook 23 of the body 16 in engagement with the hooked portion 30 of the reflector 17a or 17b.

The reflecting surface of each of the right and left reflectors 17a and 17b is formed as a polygonal surface having a plurality of reflecting elements 28. As a result, the reflector units 17 have a high light reflecting performance, and present an appearance of high-quality finish.

The cover member 18 is C-shaped in plan view, and includes right and left lens regions 32 for forwardly transmitting light emitted from the main bulb 25 and emerging from the light radiating planes of the reflectors 17a and 17b, a front wall region 33 extending between inward ends of these lens regions 32, and side wall regions 34 bent and extending rearward from outward ends of the right and left lens regions 32. When the cover member 18 is assembled to the body 16, each lens region 32 is shaped and positioned to overlap the light radiating plane one of the reflectors 17a and 17b.

Each of the right and left lens regions 32 is a dear cover portion without being cut to define light collecting and distributing cover elements. Therefore, the cover member 18 may be molded easily and at low cost. The front wall region 33 has a plurality of parallel ribs 35 arranged vertically on a back surface thereof and projecting horizontally rearward therefrom. As a result, the cover member 18 is reinforced in the front wall region 33 to prevent bending of the front wall region 33. Each of the right and left side wall regions 34 also has a plurality of parallel ribs 36 arranged vertically on a back surface of a bend portion thereof and extending horizontally rearward therefrom. As a result, the cover member 18 is reinforced in each side wall region 34 to prevent a springback of the cover member 18 C-shaped in plan view.

Peripheral edges of the cover member 18 include engaging edges 37 for engaging the body 16, and hooks 38 for hooking the body 16. The body 16 has recesses 39 formed in surfaces thereof for attaching the cover member 18. Peripherally of the recesses 39 are engaging grooves 40 for engaging the engaging edges 37 of the cover member 18, and hooked portions 41 hooked by the hooks 38 of the cover member 18.

Figure 8:
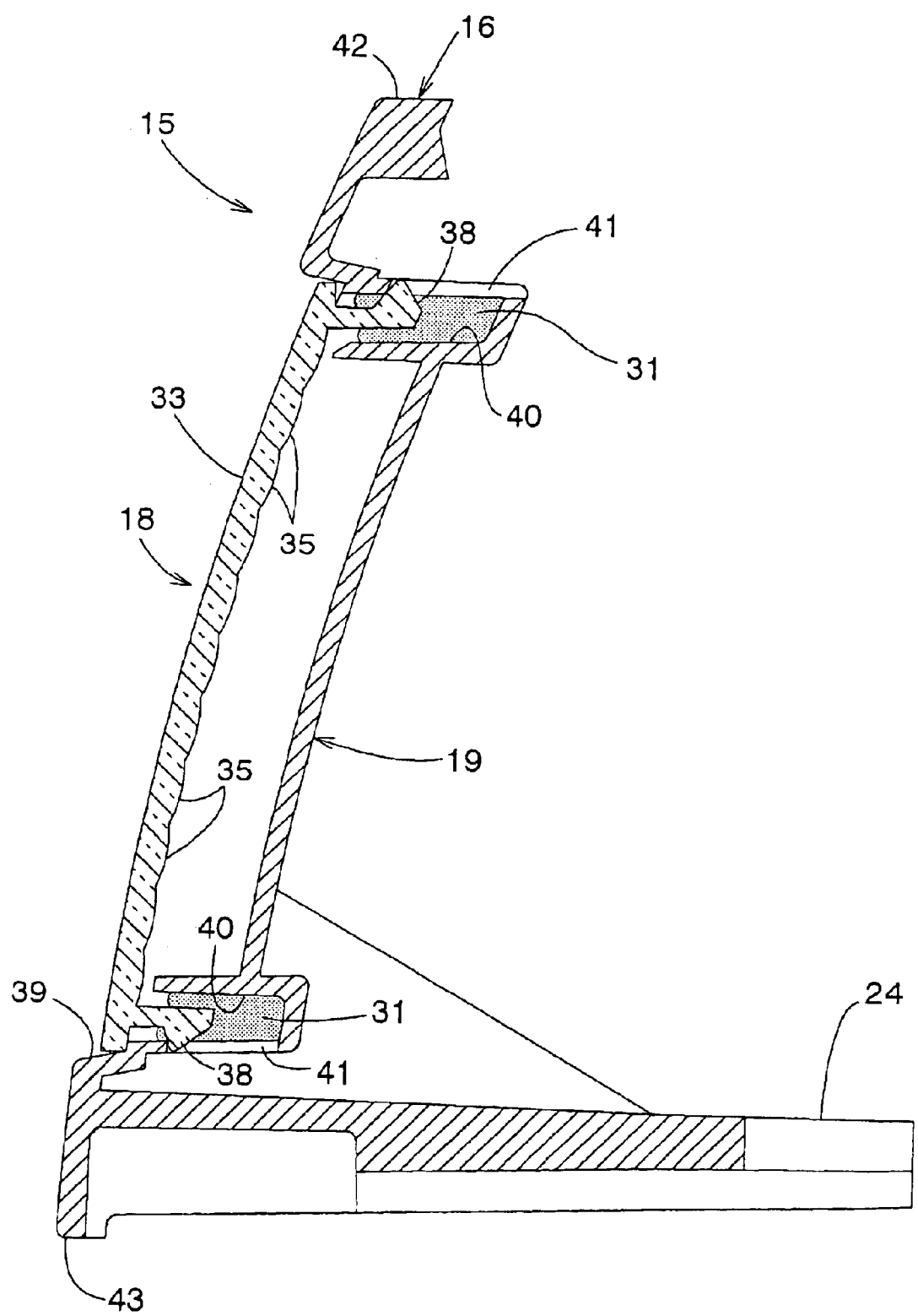
FIG. 8 is a side view in vertical section of right and left front frames of the headlight assembly.

The cover member 18 may be attached to the body 16 by placing the engaging edges 37 of the cover member 18 in the engaging grooves 40 of the body 16, with an adhesive 31 filing the engaging grooves 40, and placing the hook 38 of the cover member 18 in engagement with the hooked portion 41 of the body 16 (see FIG. 8). In time of attachment, the cover member 18 is joined and attached also to the recesses 39 of the body 16 to cover, from front, the right and left reflectors 17a and 17b.

Thus, the cover member 18 is in the form of a single unit C-shaped in plan view for covering the right and left reflectors 17a and 17b from front. This facilitates management of components, simplifies the construction, and reduces manufacturing cost, compared with a pair of right and left split cover members for covering the right and left reflectors 17a and 17b from front, respectively. Further, the cover member 18 C-shaped in plan view is joined to the body 16 approximately C-shaped in plan view to cover the right and left reflectors 17a and 17b from front. The entire body 16 may be reinforced by the cover member 18 without complicating the shape of the body 16 or without adding new reinforcing members to the body 16. As a result, high strength is secured for the headlight assembly 15 as a whole without entailing high manufacturing cost and complicated construction.

The cover member 18 is shaped such that the front wall region 33 has a vertical width L1 smaller than a vertical width L2 of the right and left lens regions 32. On the other hand, the body 16 is shaped such that the side beam 19a and lower beam 19b have exposed areas 42 and 43 opposed to the front wall region 33 of cover member 18 and having vertical widths L3 and L4 larger than vertical widths L5 and L6 of exposed areas 44 and 45 opposed to the lens regions 32. As a result, compared with the body 16 and cover member 18 having fixed vertical widths, the shapes of the body 16 and cover member 18 present an improved outward appearance. With the upper beam 19a and lower beam 19b of the body 16 having the large widths in the central portions thereof, the front frame 19, hence the body 16 itself, has increased strength.

It is to be noted that the headlight assembly 15 is turned on and off by a switch, not shown, provided as part of the driving platform 3.

Figure 12:
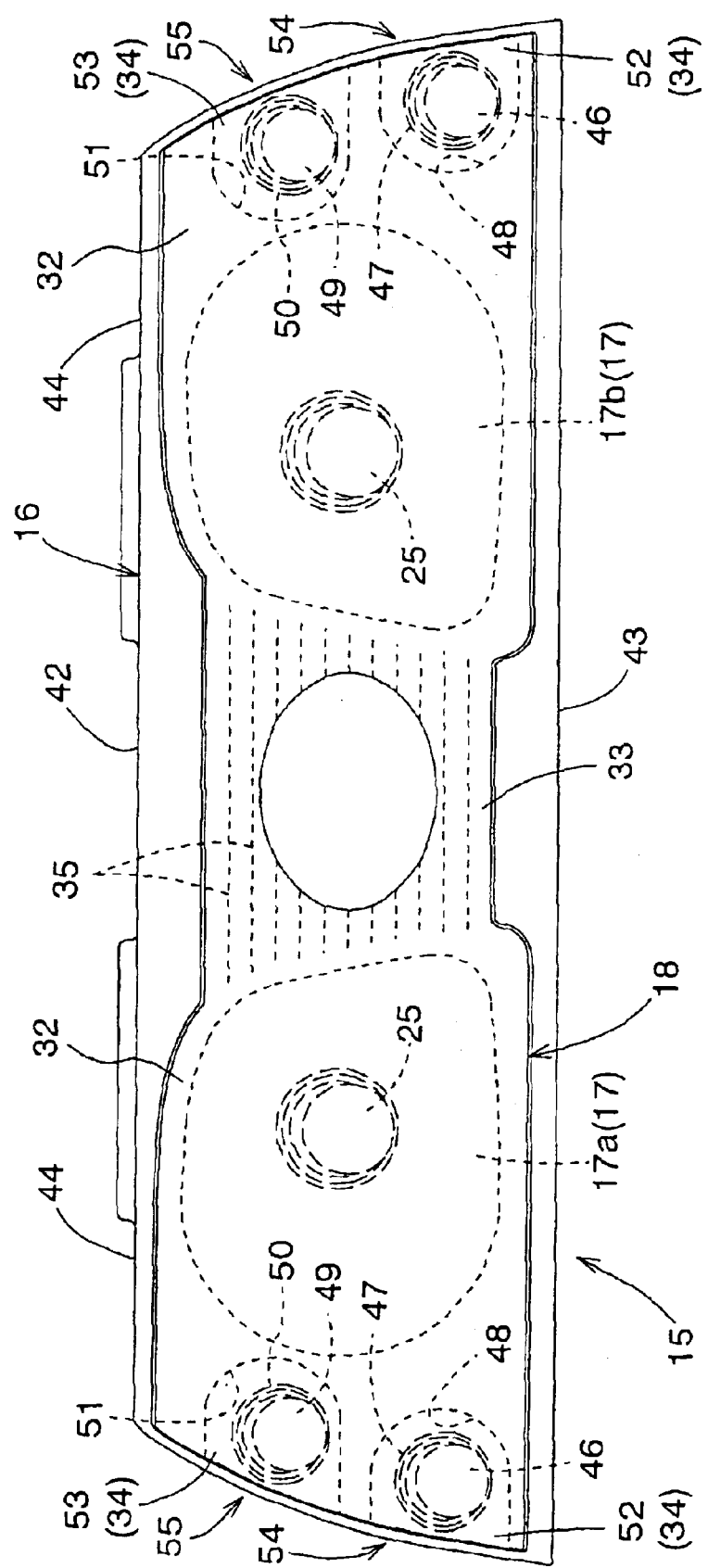
FIG. 12 is a front view of a headlight assembly in a further embodiment, with sidelights and direction indicators integrated with the headlight assembly.
Figure 13:
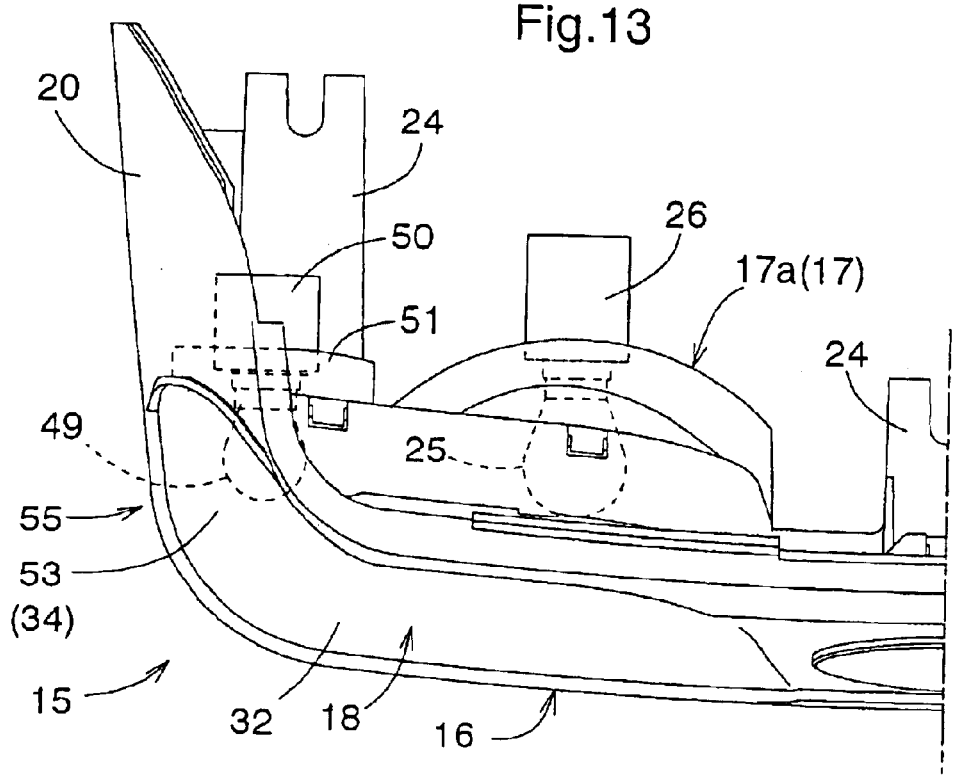
FIG. 13 is a plan view of a principal portion of the headlight assembly in the further embodiment, with the side lights and direction indicators integrated with the headlight assembly.
Figure 14:
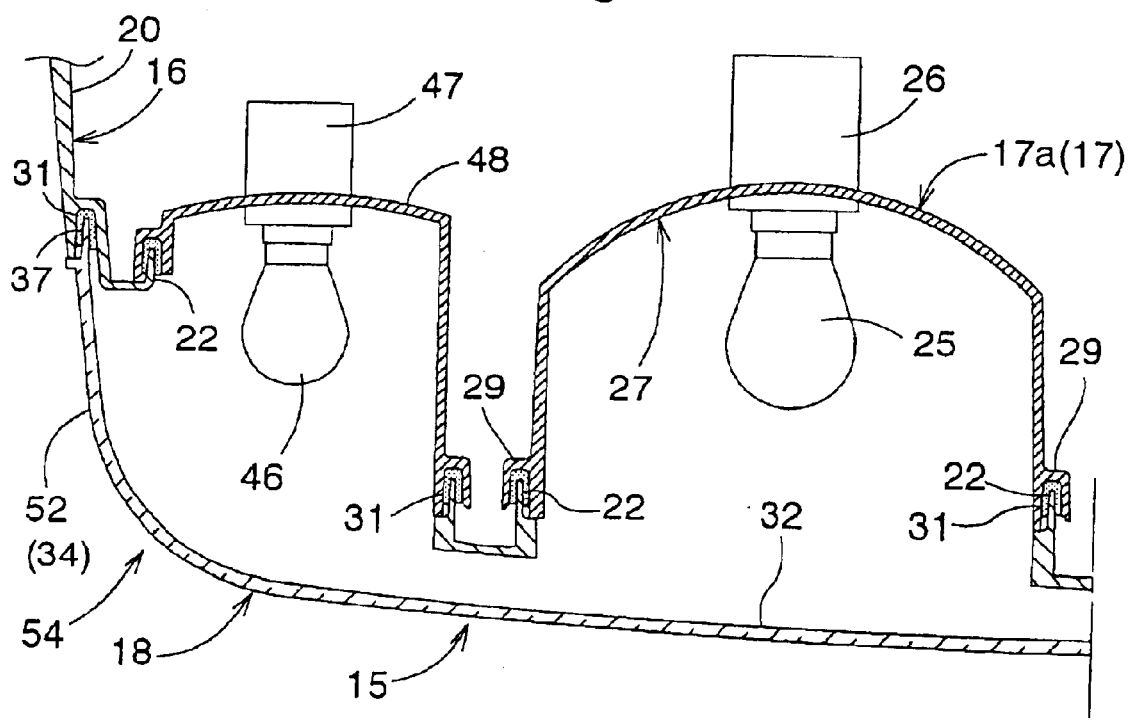
FIG. 14 is a cross-sectional plan view of a lower principal portion of the headlight assembly in the further embodiment, with the sidelights and direction indicators integrated with the headlight assembly.

The above embodiment may be modified as follows:

(1) The working vehicle may be a riding type rice planting machine or a riding type lawn mower.
(2) As shown in FIGS. 12 through 14, the body 16 has sub-reflectors 48 attached to lower positions in the corner regions of right and left side frames 20. Each sub-reflector 48 includes a bulb mount 47 for detachably attaching a sideways illuminating sub-bulb 46 from behind, and a reflecting surface for laterally reflecting light from the sub-bulb 46 attached to the bulb mount 47 (see FIG. 14).

The body 16 has other sub-reflectors 51 attached to upper positions in the corner regions of right and left side frames 20. Each sub-reflector 51 includes a bulb mount 50 for detachably attaching a direction indicator sub-bulb 49 from behind, and a reflecting surface for forwardly and laterally reflecting light from the sub-bulb 49 attached to the bulb mount 50 (see FIG. 13).

The cover member 18 has sub-lens regions 52 formed in lower positions in the corner portions of the right and left side wall regions 34 for laterally transmitting the light from the sideways illuminating sub-bulbs 46, and sub-lens regions 53 formed in upper positions in the corner portions of the right and left side wall regions 34 for forwardly and laterally transmitting the light from the direction indicator sub-bulbs 49. Thus, the headlight assembly 15 includes right and left side lights 54 and direction indicators 55.

This construction facilitates management of components, simplifies the construction, and reduces manufacturing cost, compared with right and left side lights 54 being constructed separately from the headlight assembly 15. Moreover, when making a turn at nighttime or when storing the vehicle into an unlit barn, for example, the above construction is capable of illuminating a turning direction or a location for storage. This allows the driver to visually check road conditions in the turning direction or conditions in the storage site. Further, the headlight assembly 15 integrating the right and left direction indicators 55 as well as the right and left side lights 54 facilitates management of components, simplifies the construction, and reduces manufacturing cost with increased effect. It is also possible to form the right and left sub-reflectors 48 and 51 integrally with the body 16.

The right and left side lights 54 may be turned on and off by a switch, not shown, provided as part of the driving platform 3. In response to an on-off operation of the right or left direction indicator 55, the side lamp 54 on the corresponding side may be turned on and off. The right and left sub-reflectors 48 and 51 may be formed integrally with the body 16.

What is claimed is:

1. A headlight assembly for a working vehicle comprising:

a one-piece body formed of resin connected to a front face of the vehicle, said body having a front frame, side frames bent and extending rearward from opposite ends of said front frame, and a first opening in said front frame adjacent one of the side frames and a second opening in said front frame spaced from the first opening and adjacent the other one of said side frames;

a light source units mounted to each of said openings in a fore and aft direction of the vehicle, each of said light source units including a main bulb for forward illumination, and a reflector units for forwardly reflecting light from the main bulb through its respective opening in the body; and a cover member for covering at least said openings of said body, said cover member having (1) lateral width substantially co-extensive with that of said body and formed into a one-piece member, (2) a pair of right and left lens regions opposed to light radiating planes of said reflector units, respectively, (3) a front wall region interconnecting said right and left lens regions, and (4) side wall regions bent and extending rearward from lateral ends of said right and left lens regions, respectively;

wherein said right and left lens regions comprise clear cover portions without being cut for collecting and distributing light reflected from respective one of said reflector units and said front wall region and said side wall regions comprise non-clear cover portions having ribs extending on substantially an entire area of respective back surfaces thereof.

2. A headlight assembly as defined in claim 1, wherein said ribs of said side wall regions are horizontally extending on respective bent portions of said side wall regions.

3. A headlight assembly as defined in claim 1, wherein said ribs of said front wall region are horizontally extending on said front wall region.

4. A headlight assembly as defined in claim 1, wherein said front wall region of said cover member has a vertical width smaller than a vertical width of said right and left lens regions.

5. A headlight assembly as defined in claim 4, wherein said front frame includes an upper beam and a lower beam extending horizontally, each of said upper and lower beams including portions corresponding to said right and left lens regions of said cover member and having a smaller vertical width than a vertical width of a portion corresponding to said front wall region.

6. A headlight assembly as defined in claim 1, wherein each of said reflector units comprises a pair of reflecting elements to provide formed polygonal reflecting surfaces having a predetermined light collecting and distributing pattern, and said right and left lens regions of said cover member each formed of a substantially single surface.

7. A headlight assembly as defined in claim 1, wherein each of said light source units includes a housing having said reflector unit of said light source unit in said housing with one housing mounted in said first opening, and the other housing mounted in said second opening.

8. A headlight assembly as defined in claim 1, further comprising a first sub-opening in said body between said first opening and its adjacent side frame and a second sub-opening in said body between said second opening and its adjacent side frame and further comprising a sub-reflectors in each of said sub-openings for laterally reflecting light from sub-bulbs in said sub-reflectors, said side wall regions of said cover member being formed to transmit light reflected by said sub-reflectors.

9. A headlight assembly as defined in claim 1, wherein said body further comprises flanges extending from lower edges of said front frame and said side frames rearward in the fore and aft direction of the vehicle, for connecting said body to said front face of the vehicle.

10. A headlight assembly as defined in claim 1, wherein said ribs on said area of respective back surfaces of said side wall regions provide said non-clear cover portions.

11. A headlight assembly as defined in claim 1, wherein said cover member mounts front side of said body, and said light source units mount rear side of said body.

12. A headlight assembly for a working vehicle comprising:

an integral body unit formed of resin having a front frame, and side frames bent and extending rearward from opposite ends of said front frame and at least one opening defined as a first opening in said front frame adjacent one of said side frames and at least one opening defined as a second opening in said front frame adjacent the other one of said side frames and spaced from the first opening;

a first light source unit mounted in said first opening and a second light source unit mounted in said second opening of said body unit, said first and second light source units each comprising main bulb, a sub-bulb and reflector units for forward illumination through its respective one of said openings; and a cover member for covering at least a large part of said body unit, said cover member comprising (1) a pair of right and left lens regions opposed to light radiating planes of said reflector units of said first and second light source units, respectively, a front wall region interconnecting said right and left lens regions, and said right and left lens regions comprise clear cover portions without being cut for collecting and distributing light reflected from respective one of said reflector units, and (2) side wall regions bent and extending rearward from lateral ends of said right and left lens regions, respectively, said side wall regions of said cover member transmitting light from adjacent one of said sub-bulbs reflected from said reflector units through said openings;

wherein said front wall region and said side wall regions of said cover member comprise non-clear cover portions having ribs formed on respective back surfaces thereof.

13. A headlight assembly as defined in claim 12, wherein said ribs of said side wall regions are horizontally extending on respective bent portions of said side wall regions.

14. A headlight assembly as defined in claim 12, wherein said ribs of said front wall region are horizontally extending on said front wall region.

15. A headlight assembly as defined in claim 12, wherein said front wall region of said cover member has a vertical width smaller than a vertical width of said tight and left lens regions.

16. A headlight assembly as defined in claim 15, wherein said front frame includes an upper beam and a lower beam extending horizontally, each of said upper and lower beams including portions corresponding to said right and left lens regions of said cover member and having a smaller vertical width than a vertical width of a portion corresponding to said front wall region.

17. A headlight assembly as defined in claim 12, wherein said first opening of said body unit comprises a first main opening and a first sub-opening spaced from the first main opening with the first sub-opening between the first main opening and adjacent one of said side frames of said body unit and the second opening of said body unit comprises a main opening defined as a second main opening and a sub-opening defined as a second sub-opening spaced from the second main opening with the second sub-opening between the second main opening and adjacent one of said side frames of said body unit;

wherein the first light source unit comprises a first main housing mounted in the first main opening and having an inner reflective surface and one of said main bulbs and a first sub-housing mounted in the first sub-opening and having an inner reflective surface and one of said sub-bulbs and the second light source unit comprises a main housing defined as a second main housing, said second main housing mounted in said second main opening and having an inner reflective surface and one of said main bulbs and a sub-housing defined as a second sub-housing mounted in the second sub-opening and having an inner reflective surface and one of said sub-bulbs and;

wherein said reflective surfaces of said first and second housings and said first and second sub-housings being formed independently of each other.

18. A headlight assembly as defined in claim 17, wherein said reflective surfaces of said first and second main housings are each formed polygonal to have a plurality of reflecting elements for producing a predetermined light collecting and distributing pattern, and said right and left lens regions of said cover member each formed of a substantially single surface.

19. A headlight assembly as defined in claim 12, wherein said body unit further has flanges extending from lower edges of said front frame and said side frames rearward in the fore and aft direction of the vehicle, for connecting said body to said front face of the vehicle.

20. A headlight assembly as defined in claim 12, wherein said cover member has a lateral width substantially co-extensive with that of said body unit and formed into a one-piece member by said right and left lens regions, said front wall region, and said side wall regions.

21. A headlight assembly as defined in claim 12, wherein said front wall region and said side wall regions have ribs extending on substantially an entire area of respective back surfaces thereof.

22. A headlight assembly as defined in claim 12, wherein said cover member mounts front side of said body unit, and said light source units mount rear side of said body unit.

23. A headlight assembly for a working vehicle comprising:
a body having a front frame, and side frames bent and extending rearward from opposite ends of said front frame, said body being an integral unit formed of resin and having a pair of right and left openings formed in said body;
light source units mounted in a said pair of right and left openings formed in said body, said light source units including a pair of right and left main bulbs for forward illumination, and reflector units for forwardly reflecting light from the main bulbs through its respective one of said openings; and
a cover member for covering at least the right and left openings, said cover member including a pair of right and left lens regions opposed to light radiating planes of said reflector units, respectively, a front wall region interconnecting said right and left lens regions, and side wall regions bent and extending rearward from lateral ends of said right and left lens regions, respectively;
wherein said right and left lens regions comprise clear cover portions without being cut for collecting and distributing light reflected from respective said reflector units; whereas said front wall region and said side wall regions comprise non-clear cover portions having ribs formed on respective back surfaces thereof; and
said front wall region of said cover member has a vertical width smaller than a vertical width of said right and left lens regions.

24. A headlight assembly as defined in claim 23, wherein said front frame includes an upper beam and a lower beam extending horizontally, each of said upper and lower beams including portions corresponding to said right and left lens regions of said cover member and having a smaller vertical width than a vertical width of a portion corresponding to said front wall region.

25. A headlight assembly as defined in claim 23, wherein said ribs of said side wall regions are horizontally extending on respective bent portions of said side wall regions.

26. A headlight assembly as defined in claim 23, wherein said ribs of said front wall region are horizontally extending on said front wall region.

27. A headlight assembly as defined in claim 23, wherein said reflector units having reflecting surfaces each formed polygonal to have a plurality of reflecting elements for producing a predetermined light collecting and distributing pattern, and said right and left lens regions of said cover member each formed of a substantially single surface.

28. A headlight assembly as defined in claim 23, wherein said reflector units include a left reflector mounted in said left opening, and a right reflector mounted in said right opening, said left and right reflectors being formed independently of each other.

29. A headlight assembly as defined in claim 23, wherein said light source units further include right and left sub-reflectors for laterally reflecting light from sub-bulbs, said side wall regions of said cover member being formed to transmit light reflected by said sub-reflectors.

30. A headlight assembly as defined in claim 23, wherein said body further has flanges extending from lower edges of said front frame and said side frames rearward in the fore and aft direction of the vehicle, for connecting said body to said front face of the vehicle.

31. A headlight assembly as defined in claim 23, wherein said cover member has a lateral width substantially co-extensive with that of said body and formed into a one-piece member by said right and left lens regions, said front wall region, and said side wall regions.

32. A headlight assembly as defined in claim 23, wherein said front wall region and said side wall regions have ribs extending on substantially an entire area of respective back surfaces thereof.

33. A headlight assembly as defined in claim 23, wherein said cover member mounts first side of said body, and said light source units mount rear side of said body.

* * * * *

UNITED STATES PATENT AND TRADEMARK OFFICE
CERTIFICATE OF CORRECTION

PATENT NO. : 6,821,006 B2
DATED : November 23, 2004
INVENTOR(S) : Shikiya

It is certified that error appears in the above-identified patent and that said Letters Patent is hereby corrected as shown below:

Column 6,
Line 52, "a light source units" should read -- a light source unit --
Line 55, "reflector units" should read -- reflector unit --
Line 59, "(1) lateral width" should read -- (1) a lateral width --

Column 7,
Lines 40-41, "a sub-reflectors" should read -- a sub-reflector --

Column 8,
Line 2, "comprising main" should read -- comprising a main --
Line 32, "said tight and left" should read -- said right and left --

Signed and Sealed this

Fourteenth Day of June, 2005

JON W. DUDAS
*Director of the United States Patent and Trademark Office*